(12) United States Patent
Pfeiffer

(10) Patent No.: US 10,501,928 B2
(45) Date of Patent: Dec. 10, 2019

(54) SPLIT CONNECTOR AND MODULAR FRAME COMPRISING SUCH A SPLIT CONNECTOR

(71) Applicant: FlexLink AB, Göteborg (SE)

(72) Inventor: Thomas Pfeiffer, Dissen T.W. (DE)

(73) Assignee: FlexLink AB, Göteborg (SE)

( * ) Notice: Subject to any disclaimer, the term of this patent is extended or adjusted under 35 U.S.C. 154(b) by 0 days.

(21) Appl. No.: 15/781,951

(22) PCT Filed: Dec. 15, 2016

(86) PCT No.: PCT/SE2016/051270
§ 371 (c)(1),
(2) Date: Jun. 6, 2018

(87) PCT Pub. No.: WO2017/105334
PCT Pub. Date: Jun. 22, 2017

(65) Prior Publication Data
US 2019/0024362 A1    Jan. 24, 2019

(30) Foreign Application Priority Data
Dec. 16, 2015 (SE) ........................ 1551659

(51) Int. Cl.
*F16B 7/18* (2006.01)
*E04B 1/24* (2006.01)
(Continued)

(52) U.S. Cl.
CPC ............ *E04B 1/2403* (2013.01); *A47B 47/02* (2013.01); *E04B 1/1912* (2013.01); *F16B 7/18* (2013.01);
(Continued)

(58) Field of Classification Search
CPC ................. E04B 1/2403; E04B 1/1912; E04B 2001/2475; E04B 2001/2406; F16B 7/18; A47B 47/02; A47B 2230/04
See application file for complete search history.

(56) References Cited

U.S. PATENT DOCUMENTS 5,580,181 A * 12/1996 Nomura ............. A47B 47/0016
403/170
8,707,653 B2 * 4/2014 Calleja ...................... E04B 1/24
29/525.11
(Continued)

FOREIGN PATENT DOCUMENTS

AU    2015201461 A1   10/2015
DE        1484277 B1 *  4/1970 ......... A47B 47/0008
(Continued)

OTHER PUBLICATIONS

"International Application No. PCT/SE2016/051270, International Search Report dated Mar. 16, 2017", (Mar. 16, 2017), 5 pgs.
(Continued)

*Primary Examiner* — Adriana Figueroa
(74) *Attorney, Agent, or Firm* — Schwegman Lundberg & Woessner, P.A.

(57) ABSTRACT

Split connector adapted to be used for interconnecting profile bars in a frame structure, where the split connector is cube shaped and comprises a first connecting element and a second connecting element, where the first connecting element comprises screw holes adapted for connecting the first connecting element to a split profile section, a profile bar, and to the second connecting element, where the second connecting element comprises screw holes adapted for connecting the second connecting element to a split profile section and a profile bar, and a first threaded hole adapted for receiving a screw when connecting the first connecting element to the second connecting element. The advantage of
(Continued)

the invention is that a modular machine frame is obtained, in which a frame section can easily be removed.

11 Claims, 5 Drawing Sheets

(51) Int. Cl.
  *A47B 47/02* (2006.01)
  *E04B 1/19* (2006.01)
(52) U.S. Cl.
  CPC .......... *F16B 7/185* (2013.01); *A47B 2230/04* (2013.01); *E04B 2001/2406* (2013.01); *E04B 2001/2475* (2013.01)

(56) References Cited

U.S. PATENT DOCUMENTS

| | | | | |
|---|---|---|---|---|
| 9,416,807 | B2* | 8/2016 | Simmons | F16B 7/048 |
| 9,458,874 | B2* | 10/2016 | Sim | E04B 1/5831 |
| 9,546,675 | B2* | 1/2017 | Evitt | A47B 47/005 |
| 9,664,222 | B2* | 5/2017 | Evitt | A47B 47/005 |
| 2012/0019118 | A1* | 1/2012 | Fan | H05K 7/1488 312/351.1 |
| 2017/0145679 | A1* | 5/2017 | Upfal | E04B 1/2403 |

FOREIGN PATENT DOCUMENTS

| | | | | |
|---|---|---|---|---|
| DE | 9212546 U1 * | 12/1992 | | F16B 12/40 |
| EP | 0152987 A1 | 8/1985 | | |
| GB | 1564216 A | 4/1980 | | |
| KR | 101348054 B1 | 1/2014 | | |
| KR | 101498462 B1 | 3/2015 | | |
| KR | 101551428 B1 | 9/2015 | | |
| WO | WO-8903461 A1 * | 4/1989 | | E04B 1/1912 |
| WO | WO-89003461 A1 | 4/1989 | | |
| WO | WO -0191859 A1 * | 12/2001 | | A47B 47/0016 |
| WO | WO-2012023651 A1 * | 2/2012 | | E04H 1/272 |
| WO | WO-2012023651 A1 | 2/2012 | | |
| WO | WO-2012078107 A1 * | 6/2012 | | F16B 7/185 |

OTHER PUBLICATIONS

"International Application No. PCT/SE2016/051270, Written Opinion dated Mar. 16, 2017", (Mar. 16, 2017), 6 pgs.

* cited by examiner

SPLIT CONNECTOR AND MODULAR FRAME COMPRISING SUCH A SPLIT CONNECTOR

PRIORITY APPLICATIONS

This application is a U.S. National Stage Filing under 35 U.S.C. 371 from International Application No. PCT/SE2016/051270, filed on Dec. 15, 2016, and published as WO2017/105334 on Jun. 22, 2017, which claims the benefit of priority to Swedish Application No. 1551659-4, filed on Dec. 16, 2015; the benefit of priority of each of which is hereby claimed herein, and which applications and publication are hereby incorporated herein by reference in their entirety.

TECHNICAL FIELD

The present invention relates to a split connector to be used for assembling machine frames, and a split profile bar adapted to be used with the split connector. The split connector comprises two connecting elements, which when assembled fits in a standard modular system. The same applies to the split profile bar, where two split profile bars will correspond to a standard open profile bar. The split connector can be used in protective modular machine housings and in protective modular machine fences. The split connector and the split profile bar allows for an easy and cost-effective assembly of a machine housing or a machine fence. Further, the split connector and the split profile bar allows for an easy removal of a modular section in order to gain access to a specific machine part.

BACKGROUND ART

Aluminium profile bars are used for different purposes throughout the industry. One use is beams for conveyor systems. Another use is to provide protective machine housings or protective machine fences, which are intended to enclose a machine in a safe way. Such an enclosure is often assembled from profile bars interconnected by different joint elements depending on requirements, load-carrying capacity and function. Different profile systems are known and supplied from different suppliers.

Such systems comprise straight or curved profile bars of different dimensions, and a number of joint elements, base elements, fittings and panel elements. The different parts are selected and are easily mounted in a modular manner, where all parts fit together in a flexible way. It thus possible to build a modular construction such as a machine housing or a machine fence of any desired size and shape in an easy way, often without the need to use any special tools. An example of a company producing such modular systems is MS Plus Automation, which supplies modular profile systems of various sizes. Such systems provide a good protection and a pleasant appearance.

However, such modular systems have some characteristics that may be disadvantageous in some circumstances. One problem may be that a modular construction must be built from one side to the other in a specific order, such that all joint elements can be attached in the proper order. If a part in the middle must be removed, a large part of the modular construction must be disassembled in order to reach the joints in the middle.

Another disadvantage may be that the modular system does not allow a modular construction to be built in modular sections that are preassembled at one building site and are then assembled to the complete modular construction at the end user site. Such a case may be when a machine with a protective housing is to be tested at the production site before delivery. If the protective housing is completely assembled at the production site, it cannot be disassembled into modular sections for an easy transportation and delivery. Instead, the protective housing must be delivered completely assembled or must be disassembled before delivery.

There is thus room for an improved connector and an improved modular system.

DISCLOSURE OF INVENTION

An object of the invention is therefore to provide a split connector adapted to be used for interconnecting profile bars. A further object of the invention is to provide a split profile bar adapted to be used with such a split connector. A further object of the invention is to provide an inventive modular frame using such a split connector.

The solution to the problem according to the invention is described in the characterizing part of claim 1 for the split connector, in claim 9 for a split profile bar and in claim 11 for a modular frame. The other claims contain advantageous embodiments and further developments of the split connector and the split profile bar.

In a split connector adapted to be used for interconnecting profile bars in a frame structure, where the split connector comprises a first connecting element and a second connecting element, where the split connector is cube-shaped when the first connecting element and the second connecting element are mounted to each other, the object of the invention is achieved in that the first connecting element comprises a first screw hole adapted for connecting the first connecting element to a split profile section in a first direction, a second screw hole adapted for connecting the first connecting element to a profile bar in a second direction, where the first direction is perpendicular to the second direction, and a third screw hole adapted for connecting the first connecting element to the second connecting element, where the second connecting element comprises a fourth screw hole adapted for connecting the second connecting element to a split profile section in the first direction, a fifth screw hole adapted for connecting the second connecting element to a profile bar, and a first threaded hole adapted for receiving a screw through the third screw hole connecting the first connecting element to the second connecting element.

By this first embodiment of the split connector according to the invention, a connector comprising a first connecting element and a second connecting element is provided. With the inventive split connector, it is possible to provide true modular machine housings and machine frames, where the housing or frame can be preassembled in flat modules that easily can be assembled at the end production site. The inventive split connector also allows the removal of a single module from a housing or frame in order to gain access to the machine or a part of the machine.

The split connector is adapted to the size of a modular profile system. Such profile systems normally comprises profiles having a square cross section and which are provided with slots and channels adapted for the interconnection of profile bars and for holding various accessories. A split connector will be cube-shaped when the two connecting elements are mounted to each other.

The split connector is adapted to be used with profile bars and split profile bars having a square cross section. A split profile bar is a profile bar that will resemble a profile bar having a square cross section when two split profile sections are mounted to each other. A split profile bar resembles a profile bar that has been split in a longitudinal direction. The cross section of a split profile section is somewhat triangular, and may comprise the same slots and channels as a regular profile bar. The same accessories can thus be attached to a split profile bar.

By using split connectors together with profile bars and split profile bars, a modular machine housing can be provided. A module may consist of four connecting elements, i.e. four half split connectors, two split profile sections and two regular profile bars. The modules are preferably preassembled before they are assembled to a modular machine housing. Several modules can easily be assembled by interconnecting the connecting elements of the split connectors. In this way, a machine housing may be erected in a fast and easy manner at the machine site. Normally, the profile bars are mounted to each other with various joint elements, which is rather time consuming. By using split connectors, the time consuming preassembly can be made at a location distant from the machine site.

The split connector can also be used to provide one or more removable modules in a regular machine housing. Even if there is no advantage of assembling a machine housing from several modules, it is still possible to integrate one or a few modules in a regular machine housing. The split connector will allow access to different parts of the machine that does not need to be accessed every day. For daily access to a machine, a door using hinges is used. A module using split connectors may be of advantage for maintenance access, e.g. for regular maintenance with longer time intervals. In this way, access is obtained by loosening a few screws. This will also prevent unauthorized access or access to a machine by mistake.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
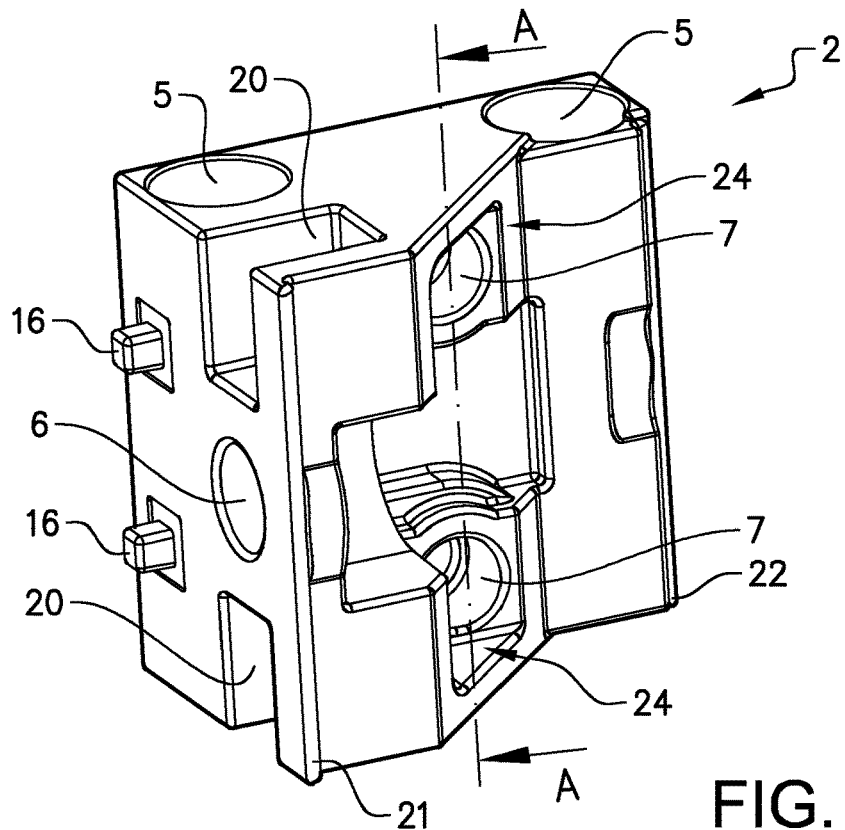
FIG. 1 shows a first connecting element comprised in a split connector according to the invention.
Figure 2:
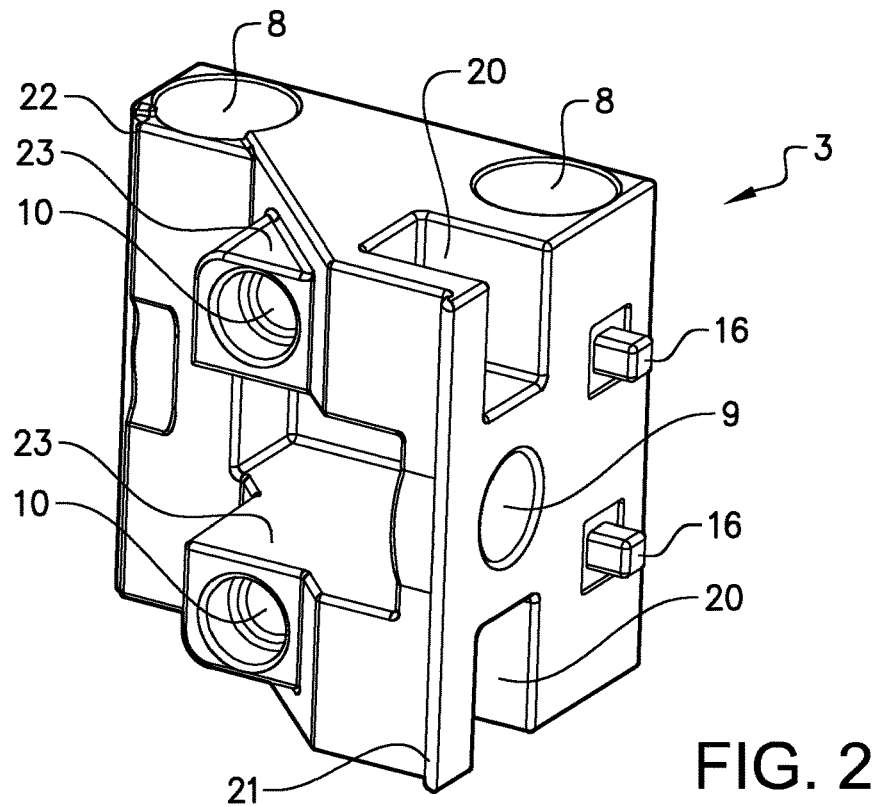
FIG. 2 shows a second connecting element comprised in a split connector according to the invention.
Figure 3:
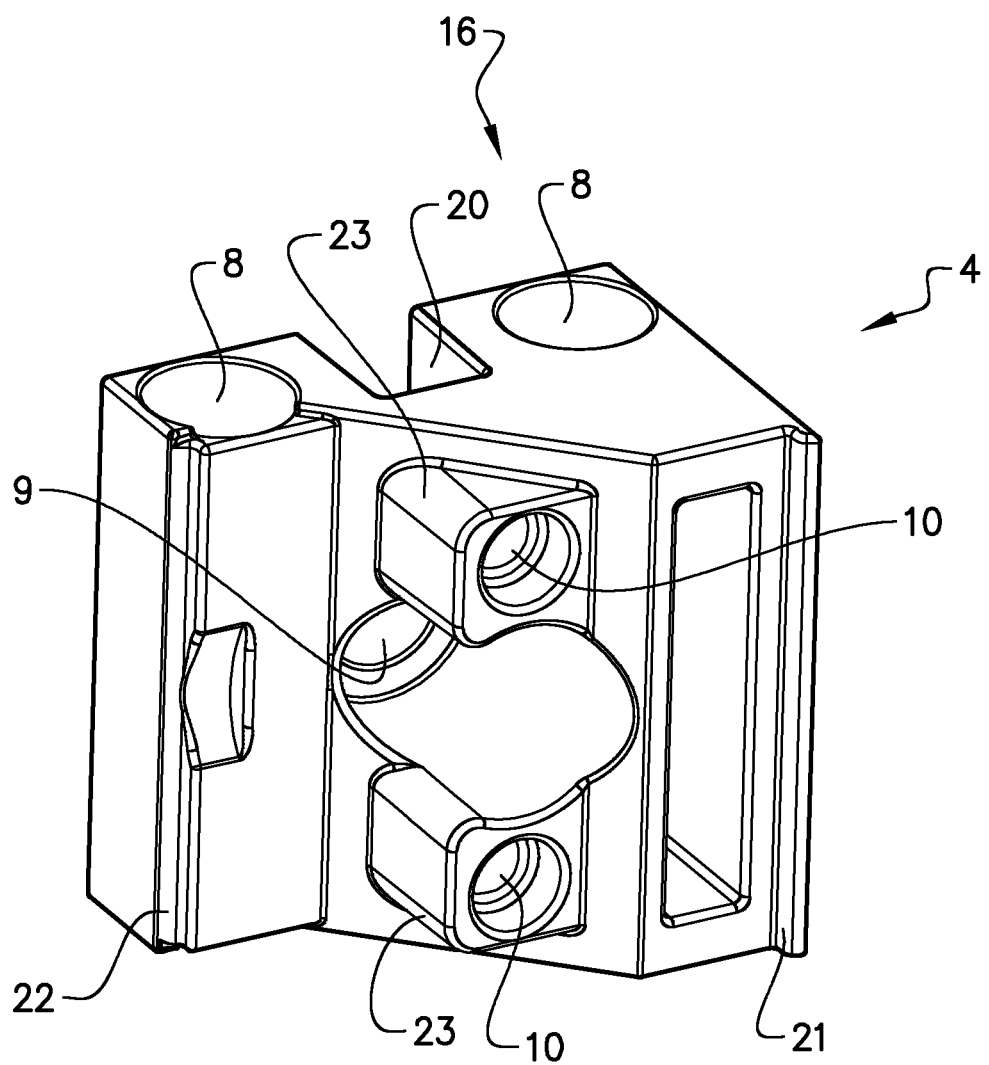
FIG. 3 shows another example of a second connecting element comprised in a split connector according to the invention.

FIG. 1 shows a first connecting element in a perspective view of a split connector according to the invention, FIG. 2 shows a second connecting element in a perspective view of a split connector according to the invention, and FIG. 3 shows another example of a second connecting element in a perspective view of a split connector according to the invention. A split connector 1 comprises a first connecting element 2 and a second connecting element 3; 4. The used second connecting element 3; 4 can be one of two different second connecting elements. One second connecting element 3 is a rear connecting element. A rear connecting element is used when a straight connection is required, i.e. when two adjacent frame modules should extend in the same plane. Another second connecting element 4 is a corner connecting element. A corner connecting element is used when a corner connection is required, i.e. when two adjacent frame modules should be perpendicular to each other. Regardless of which type of connection that is required, a first connecting element is always used together with one second connecting element in order to form a split connector.

FIG. 1 shows a view of a first or front connecting element 2. This connecting element will be used as a front element, i.e. will be the connecting element that is visible from the outside of the machine housing or machine frame. The screws holding the first and the second connecting element together will be mounted to and held by the first connecting element. The first connecting element 2 comprises at least one first screw hole 5 adapted for connecting the first connecting element to a split profile section of a split profile bar. In the shown example, the first connecting element comprises two first screw holes 5, where each first screw hole corresponds to a closed channel in a split profile section. By using two first screw holes, a rotationally fixed connection between the first connecting element and a split profile section is obtained.

The first connecting element 2 further comprises a second screw hole 6 adapted for connecting the first connecting element to a regular profile bar, where the second screw hole is arranged centrally in the connector element, such that the second screw hole corresponds to a closed channel arranged in the centre of a regular profile bar. Since there is only room for one second screw hole, the first connection element is provided with one or more protrusions 16 which are adapted to correspond to and fit in an open slot in the regular profile bar. In this way, a rotationally fixed connection between the first connecting element and a regular profile bar is obtained.

The first connecting element 2 further comprises at least one third screw hole 7 adapted for connecting the first connecting element 2 to a second connecting element. In the shown example, the first connecting element comprises two third screw holes 7. The first connecting element is provided with recesses 24 at the inner side of each third screw hole. A recess is adapted to cooperate with a projection 23 of a second connecting element, in order to improve the stability of the split connector. The first connecting element is further provided with a flange 21 and a groove 22, adapted to cooperate with a corresponding groove and flange of a second connecting element. The first connecting element is also provided with one or more cut outs 20, which will correspond to longitudinal open slots in a profile bar.

Figure 4:
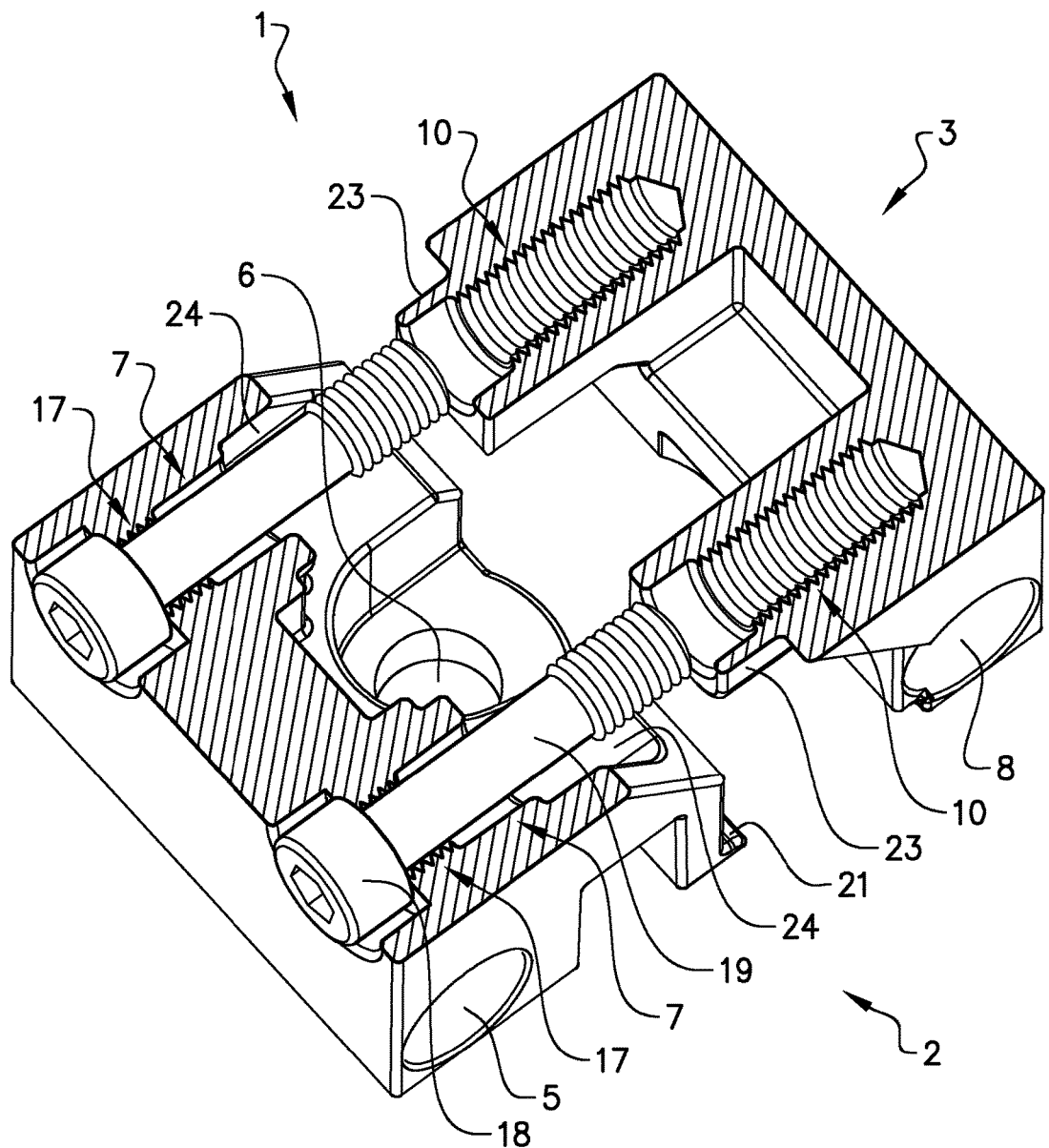
FIG. 4 shows a cut view of the first connecting element and a second connecting element comprised in a split connector according to the invention.

The third screw holes 7 are in the shown example provided with a thread 17, as shown in FIG. 4 where a cut view along A-A of FIG. 1 is shown. The thread 17 is adapted to hold a screw 18 in a secure way to the first connecting element, such that the screw does not fall out of the third screw holes. The screw 18 is a screw which is only provided with a thread at the front part of the screw. The middle part of the screw is provided with a shank 19 having a diameter which is smaller than the threaded front part, such that the shank easily fits inside the threaded screw hole 7. Such a screw is referred to as a thin shank screw. In order to insert the screw, the screw must be screwed in through the thread 17. When once inserted, the screw will be held in place in a secure way. A split view of a rear connecting element 3 is also shown in FIG. 4.

FIG. 2 shows a view of a second connecting element, in this case a rear connecting element 3. This connecting element will be used as a rear element, i.e. will be the connecting element that is mounted behind the front connecting element and is mounted at the inner side of a machine housing or machine frame when a straight connection is required. The rear connecting element 3 comprises at least one fourth screw hole 8 adapted for connecting the rear connecting element to a split profile section of a split profile bar. In the shown example, the rear connecting element comprises two fourth screw holes 8, where each fourth screw hole corresponds to a closed channel in a split profile section. By using two fourth screw holes, a rotationally fixed connection between the rear connecting element and a split profile section is obtained.

The rear connecting element 3 further comprises a fifth screw hole 9 adapted for connecting the rear connecting element to a regular profile bar, where the fifth screw hole is arranged centrally in the connector element, such that the fifth screw hole corresponds to a closed channel arranged in the centre of a regular profile bar. Since there is only room for one fifth screw hole, the rear connection element is provided with one or more protrusions 16 which are adapted to correspond to and fit in an open slot in the regular profile bar. In this way, a rotationally fixed connection between the rear connecting element and a regular profile bar is obtained.

The rear connecting element 3 further comprises at least one first threaded hole 10 adapted for receiving a screw through the third screw hole of the first connecting element when the first connecting element is attached to the rear connecting element. In the shown example, the rear connecting element comprises two first threaded holes 10. The rear connecting element is provided with projections 23 at the inner side of each first threaded hole. A projection 23 is adapted to cooperate with a recess 24 of a first connecting element, in order to improve the stability of the split connector. The projection also allows the thread to be longer and provides a flat entrance surface for the screw, which simplifies the assembly of a split connector. The rear connecting element is further provided with a flange 21 and a groove 22, adapted to cooperate with a corresponding groove and flange of a first connecting element. The rear connecting element is also provided with one or more cut outs 20, which will correspond to longitudinal open slots in a profile bar.

FIG. 3 shows a view of a second connecting element, in this case a corner connecting element 4. This connecting element will be used when a corner joint is required. The corner connecting element 4 resembles the rear connecting element 3, but with the difference that the centrally arranged screw hole is adapted to connect to a profile bar in a different direction than the rear connecting element. The corner connecting element comprises at least one fourth screw hole 8 adapted for connecting the corner connecting element to a split profile section of a split profile bar. In the shown example, the corner connecting element comprises two fourth screw holes 8, where each fourth screw hole corresponds to a closed channel in a split profile section. By using two fourth screw holes, a rotationally fixed connection between the corner connecting element and a split profile section is obtained.

The corner connecting element 4 further comprises a fifth screw hole 9 adapted for connecting the corner connecting element to a regular profile bar, where the fifth screw hole is arranged centrally in the connector element, such that the fifth screw hole corresponds to a closed channel arranged in the centre of a regular profile bar. Since there is only room for one fifth screw hole, the corner connection element is provided with one or more protrusions 16 which are adapted to correspond to and fit in an open slot in the regular profile bar. In this way, a rotationally fixed connection between the corner connecting element and a regular profile bar is obtained.

The corner connecting element 4 further comprises at least one first threaded hole 10 adapted for receiving a screw through the third screw hole of the first connecting element when the first connecting element is attached to the corner connecting element. In the shown example, the corner connecting element comprises two first threaded holes 10. The corner connecting element is provided with projections 23 at the inner side of each first threaded hole. A projection 23 is adapted to cooperate with a recess 24 of a first connecting element, in order to improve the stability of the split connector. The projection also allows the thread to be longer and provides a flat entrance surface for the screw, which simplifies the assembly of a split connector. The corner connecting element is further provided with a flange 21 and a groove 22, adapted to cooperate with a corresponding groove and flange of a first connecting element. The corner connecting element is also provided with one or more cut outs 20, which will correspond to longitudinal open slots in a profile bar.

Figure 5:
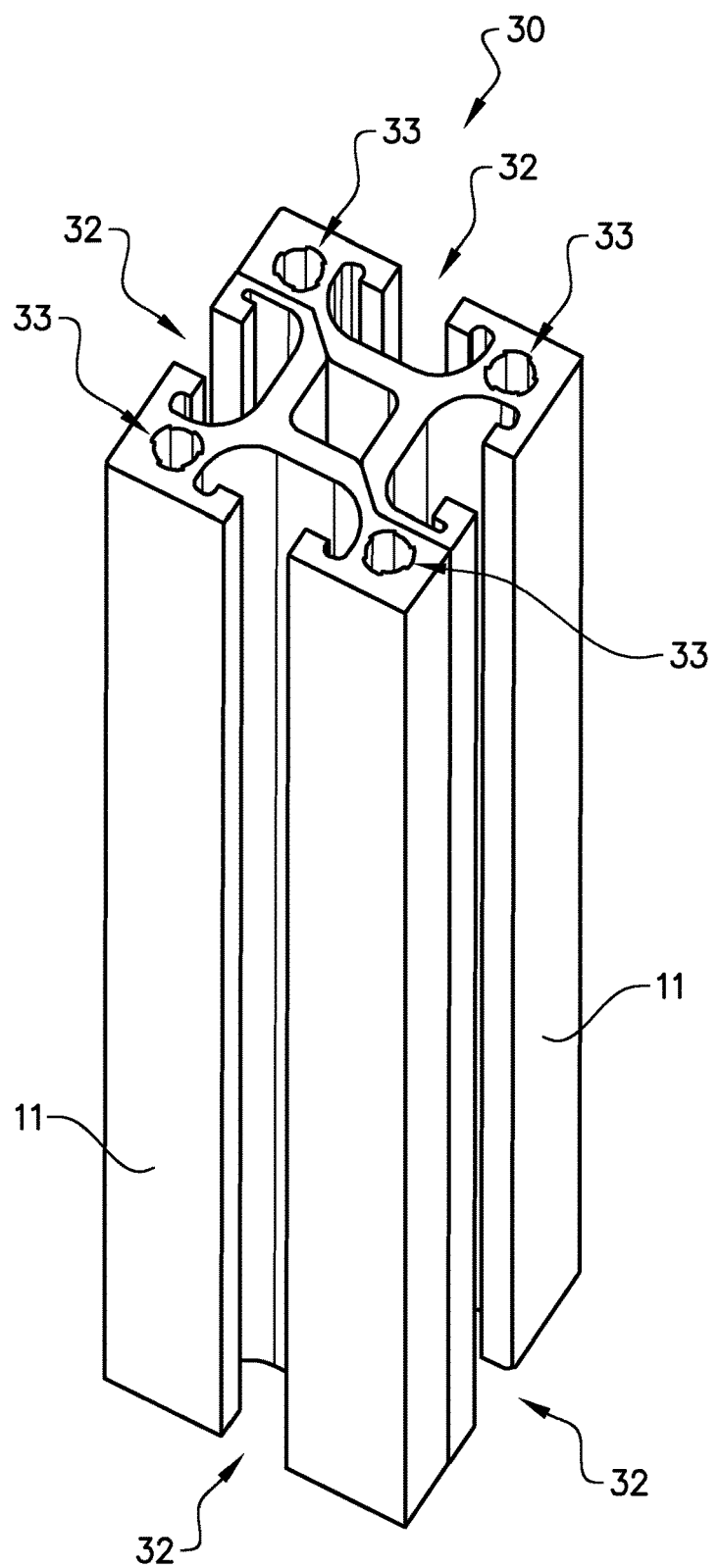
FIG. 5 shows a split profile bar to be used with a split connector according to the invention.

FIG. 5 shows a longitudinal split profile bar 30 comprising two identical split profile sections 11. The split profile bar 30 will resemble a regular longitudinal profile bar having a square cross section when two split profile sections are mounted to each other. A split profile bar resembles a profile bar that has been split in a longitudinal direction. The cross section of a split profile section is somewhat triangular. A split profile bar preferably comprises the same slots and channels as a regular profile bar. The same accessories can thus be attached to a split profile bar and to a split profile section.

A split profile section 11 comprises two open longitudinal profile slots 32 arranged at two perpendicular outer sides of the split profile section 11. A split profile section further comprises two longitudinal closed channels 33 arranged at the corners of an outer side of the split profile section 11, on each side of an open longitudinal slot. When two split profile sections are mounted to each other, a split profile bar 30 having a square cross section is obtained, where the split profile bar comprises four longitudinal closed channels 33 at each corner and comprising four open longitudinal profile slots 32 arranged there between.

Figure 6:
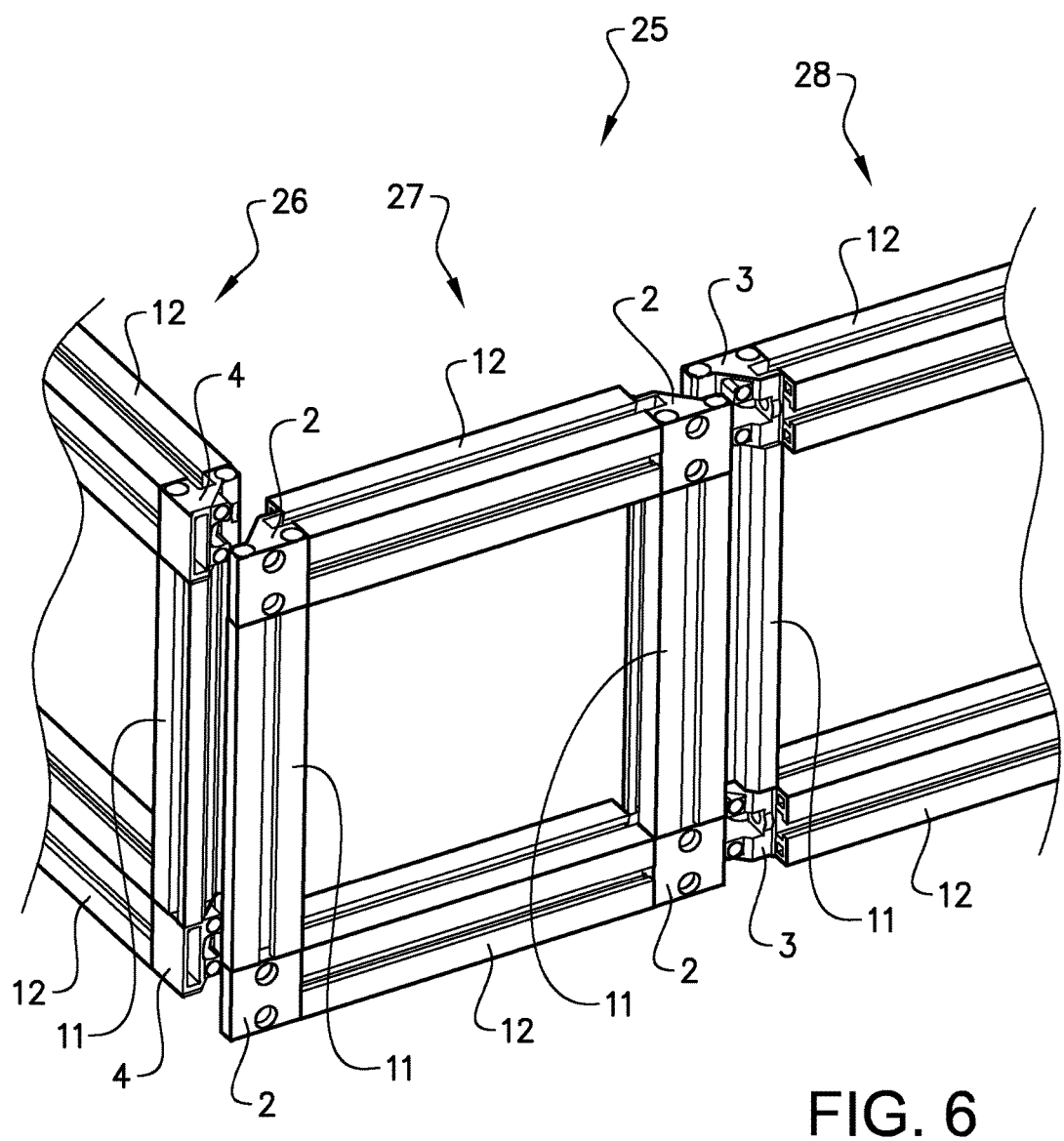
FIG. 6 shows a modular frame according to the invention.

FIG. 6 shows a modular frame structure 25 comprising three modules, a first module 26, a second module 27 and a third module 28, where a module comprises connecting elements and longitudinal elements in the form of profile bars. This modular frame structure is used as an example of a protective machine housing or machine frame. The first module is directed in a first direction and the second and third modules are directed in a second direction, perpendicular to the first direction. The joint between the first module 26 and the second module 27 will thus be a corner joint where each split connector 1 comprises a front connecting element 2 and a corner connecting element 4. The joint between the second module 27 and the third module 28 will be a straight joint where each split connector 1 comprises a front connecting element 2 and a rear connecting element 3.

The first module 26 comprises an upper and a lower profile bar 12, an upper and a lower corner connecting element 4 and a split profile section 11. A profile bar 12 is mounted to a corner connecting element 4 by the use of the fifth screw hole 9, where the screw interacts with a closed central channel in the profile bar. Each corner connecting element 4 is mounted to the split profile section 11 by the use of the fourth screw holes 8, where the screws interact with closed channels 33 of the split profile section.

The second module 27 comprises an upper and a lower profile bar 12, two upper and two lower first connecting elements 2 and two split profile sections 11. A profile bar 12 is mounted to a first connecting element by the use of the second screw hole 6, where the screw interacts with a closed central channel in the profile bar. A first connecting element 2 is mounted to a split profile section 11 by the use of the first screw holes 5, where the screws interact with closed channels 33 of the split profile section.

The third module 28 comprises an upper and a lower profile bar 12, an upper and a lower rear connecting element 3 and a split profile section 11. A profile bar 12 is mounted to a rear connecting element 3 by the use of the fifth screw hole 9, where the screw interacts with a closed central channel in the profile bar. Each rear connecting element 3 is mounted to the split profile section by the use of the fourth screw holes 8, where the screws interact with closed channels 23 of the split profile section.

The second module 27 can easily be mounted to the first module 26 and the third module 28 by using screws held by the third screw holes of the first connecting elements. When the second module is mounted, a corner joint is provided between the first and the second modules, and a straight joint is obtained between the second and the third modules. A modular protective machine housing or machine frame may comprise any number of modules. By using split connectors to attach modules to each other, selected modules can easily be dismounted when required, e.g. for replacement or maintenance of a machine.

The invention is not to be regarded as being limited to the embodiments described above, a number of additional variants and modifications being possible within the scope of the subsequent patent claims. The split connector may be used in any type of profile system using standardized square profile bars.

REFERENCE SIGNS

1: Split connector
2: First connecting element
3: Rear connecting element
4: Corner connecting element
5: First screw hole
6: Second screw hole
7: Third screw hole
8: Fourth screw hole
9: Fifth screw hole
10: First threaded hole
11: Split profile section
12: Profile bar
16: Protrusion
17: Thread
18: Thin shank screw
19: Shank
20: Cut out
21: Flange
22: Groove
23: Projection
24: Recess
25: Frame structure
26: First module
27: Second module
28: Third module
30: Split profile bar
32: Profile slot
33: Closed channel

The invention claimed is:

1. A split connector adapted to be used for interconnecting longitudinal profile bars in a frame structure, where the split connector comprises:
a first connecting element and a second connecting element, where the split connector is cube-shaped when the first connecting element and the second connecting element are mounted to each other, wherein the first connecting element comprises a first screw hole adapted for connecting the first connecting element to a split profile bar section in a first direction, a second screw hole adapted for connecting the first connecting element to a profile bar in a second direction, where the first direction is perpendicular to the second direction, and a third screw hole adapted for connecting the first connecting element to the second connecting element, where the second connecting element comprises a fourth screw hole adapted for connecting the second connecting element to a split profile section in the first direction, a fifth screw hole adapted for connecting the second connecting element to a profile bar, and a first threaded hole adapted for receiving a screw through the third screw hole connecting the first connecting element to the second connecting element; wherein the first connecting element comprises two first screw holes adapted for connecting the first connecting element to the split profile section, and two third screw holes adapted for connecting the first connecting element to the second connecting element.

2. The split connector according to claim 1, wherein the second connecting element is a corner connecting element where the fifth screw hole is adapted for connecting a rear connecting element to a profile bar in a third direction, where the third direction is perpendicular to the first direction and the second direction, such that a corner connection is obtained.

3. The split connector according to claim 1, wherein the second connecting element is a rear connecting element where the fifth screw hole is adapted for connecting the rear connecting element to a profile bar in the second direction, such that a straight connection is obtained.

4. The split connector according to claim 1, wherein the first connecting element further comprises at least one protrusion adapted for interacting with a channel in the profile bar, such that the first connecting element can be rotationally fixed to the profile bar.

5. The split connector according to claim 1, wherein the second connecting element comprises two fourth screw holes adapted for connecting the second connecting element to the split profile section, and two first threaded holes adapted for receiving two screws through the two third screw holes connecting the first connecting element to the second connecting element.

6. The split connector according to claim 1, wherein the second connecting element further comprises at least one protrusion adapted for interacting with a channel in the profile bar, such that the second connecting element can be rotationally fixed to the profile bar.

7. The split connector according to claim 1, wherein the third screw hole of the first connecting element comprises a thread such that a screw having a thin shank can be secured to the first connecting element.

8. A split profile bar adapted to be used with a split connector according to claim 1, wherein the split profile bar comprises: two identical split profile sections, where the cross section of the split profile bar is square when the split profile sections are mounted to each other, where a split profile section comprises two open longitudinal profile slots and two longitudinal closed channels, where the closed channels are adapted to receive screws for mounting a split connector to a split profile bar.

9. The split profile bar according to claim 8, wherein the two open longitudinal profile slots are arranged at two perpendicular outer sides of the split profile section, and that the two longitudinal closed channels are arranged at the same outer side of the split profile section.

10. The split connector according to claim 4, wherein the second connecting element comprises two fourth screw holes adapted for connecting the second connecting element to the split profile section, and two first threaded holes adapted for receiving two screws through the two third screw holes connecting the first connecting element to the second connecting element.

11. A modular frame, comprising a plurality of split connectors and a plurality of longitudinal split profile bars, where a split profile bar comprises two identical split profile sections, where the cross section of a split profile bar is square when the split profile sections are mounted to each other, where a split profile section comprises two open longitudinal profile slots and two longitudinal closed channels, where the closed channels receives screws mounting a split connector to a split profile bar, where a split connector comprises a first connecting element and a second connecting element, where the split connector is cube-shaped when the first connecting element and the second connecting element are mounted to each other, where the first connecting element is connected to a split profile bar section in a first direction with a screw through a first screw hole of the first connecting element, where the first connecting element is connected to a split profile bar section in a second direction with a screw through a second screw hole of the first connecting element, where the first direction is perpendicular to the second direction, where the first connecting element is connected to the second connecting element with a screw through a third screw hole of the first connecting element to a first threaded hole in the second connecting element, where the second connecting element is connected to a split profile section in the first direction with a screw through a fourth screw hole of the second connecting element, and where the second connecting element is connected to a split profile bar with a screw through a fifth screw hole of the second connecting element.

* * * * *